Jan. 1, 1963 J. P. ELLSWORTH ETAL 3,071,666

CIRCUIT INTERRUPTERS

Filed April 9, 1959 7 Sheets-Sheet 1

WITNESSES

Wm. C. Groome

James F. Young

INVENTORS
James P. Ellsworth &
Nick Yorgin.
BY
Willard R. Crout
ATTORNEY

Jan. 1, 1963 J. P. ELLSWORTH ETAL 3,071,666

CIRCUIT INTERRUPTERS

Filed April 9, 1959 7 Sheets-Sheet 2

CIRCUIT INTERRUPTERS

Filed April 9, 1959 7 Sheets-Sheet 4

Jan. 1, 1963 J. P. ELLSWORTH ETAL 3,071,666

CIRCUIT INTERRUPTERS

Filed April 9, 1959 7 Sheets-Sheet 6

Jan. 1, 1963 J. P. ELLSWORTH ET AL 3,071,666

CIRCUIT INTERRUPTERS

Filed April 9, 1959 7 Sheets-Sheet 7

United States Patent Office | 3,071,666
Patented Jan. 1, 1963

3,071,666
CIRCUIT INTERRUPTERS

James P. Ellsworth and Nick Yorgin, Beaver, Pa., assignors to Westinghouse Electric Corporation, East Pittsburgh, Pa., a corporation of Pennsylvania
Filed Apr. 9, 1959, Ser. No. 805,238
1 Claim. (Cl. 200—144)

This invention relates to circuit interrupters in general, and more particularly to improved arc-chute structures for effectively extinguishing the arcs drawn within circuit interrupters.

A general object of the present invention is to provide an improved and highly effective arc-chute structure for a circuit interrupter.

A more specific object of the invention is to provide a molded arc chute having an improved configuration for the effective extinction of arcs drawn therein.

Still a further object of the present invention is the provision of an improved arc chute having a plurality of slotted magnetic plates disposed therein, in which the magnetic plates have staggered slots to effect a lengthening of the arc, as compared to slotted plates all having uniform symmetrical slots in alignment.

Another object of the invention is to provide an improved arc chute involving spaced metallic plates in which staking operations, during assembly, are eliminated, and the metallic plates are firmly held in proper position by a novel locking arrangement.

A further object of the invention is the provision of an improved molded arc chute constituting a pair of mating side-plate sections, in which each side-plate section has a rear laterally extending flange portion, the two flange portions meeting to close the rear end of the arc chute.

Another object of the invention is the provision of an improved molded arc chute of the type set forth in the preceding paragraph, in which each of the two side-plate sections has a plurality of spaced ribs forming rearwardly extending mounting slots into which metallic plates may be inserted and held thereby in proper position.

We are aware of United States Patent 2,768,264, issued October 23, 1956, to Paul W. Jones and Robert E. Wilkinson. We have discovered a new property and characteristic of the material disclosed in this patent, whereby metallic plates may not only be supported by slotted, molded, arc-chute structures of this material, but also beneficial gas evolution occurs during arc movement within the molded arc chute, by the presence of the spacing ribs and side-wall portions of the improved arc chute. As a result of this discovery, the arc-chute structure may be considerably smaller in size than conventional arc-chute structures of the same rating. In addition, arc interruption takes place more quickly with less erosion of the arc chute by the use of the molded material hereinafter set forth, and finally, the interrupting rating of the arc chute may correspondingly be increased. This results in a smaller-size circuit interrupter utilizing the improved arc chute of our invention.

Further objects and advantages will readily become apparent upon a reading of the following specification, taken in conjunction with the drawings, in which.

Figure 1:
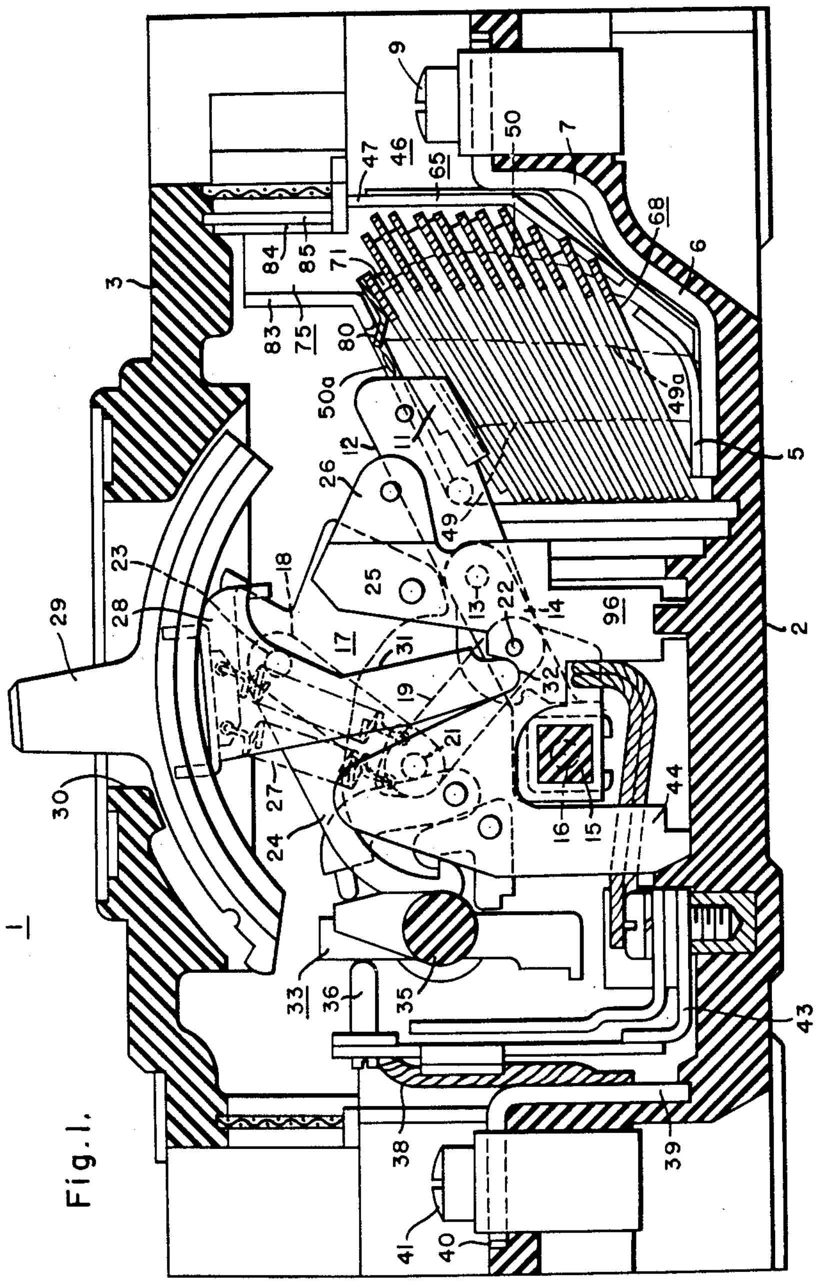
FIGURE 1 is a longitudinal vertical sectional view taken through a three-pole circuit interrupter embodying the principles of the present invention, with the contact structure shown in the open-circuit position.

Referring to the drawings, and more particularly to FIG. 1, the reference numeral 1 generally designates a three-pole circuit interrupter, only the center pole being illustrated. The circuit interrupter 1 includes a base 2 and a cover 3, both preferably being formed of a suitable moldable material, as shown. As is apparent from the drawings, the base 2 and the cover 3 are molded, with suitable recesses provided therein, to accommodate the positioning therein of the several component parts of the interrupter 1.

The interrupter 1 also comprises a relatively stationary contact 5, supported on the end of a conducting strip 6, the latter being sharply turned upwardly, as at 7, away from the bottom, or lower external surface of the base 2, being terminated at its other end at a pressure-type, line-terminal connector 9.

Cooperating with the stationary contact 5 is a movable contact 11, carried at the outer free end of a contact arm 12, the latter being pivotally mounted by a pivot pin 13 to a switch arm 14, the latter being rotatable with an insulating tie-bar 15 interconnecting the three-poles of the interrupter 1. The insulating tie-bar 15 has pins 16 projecting outwardly from its ends, which pins 16 are supported by means, not shown, in the side walls of the base 2. Thus, rotative movement of the insulating tie-bar 15 will be effective to simultaneously cause opening or closing movement of the three switch arms 14 secured thereto.

The rotation of the insulating tie-bar 15 is brought about by a toggle mechanism 17, including cooperable toggle links 18, 19 pivotally connected together by a knee pivot pin 21. The lower toggle link 19 actually comprises two toggle links, which have their lower ends pivotally connected, by means of a pivot pin 22, in the side arms of the central switch arm 14.

The upper end of the upper toggle link 18 is pivotally connected, by means of a pivot pin 23, to a releasable cradle 24, which is pivotally mounted, by means of a pivot pin 25, between a pair of upstanding frame members 26. The frame members 26 are rigidly secured, by means, not shown, to the base 2. A plurality of over-center tension springs 27 are connected between the knee pivot pin 21 of the toggle mechanism 17 and a U-shaped operating lever 28, having a handle 29 secured thereto, which projects through an opening 30 provided in the cover 3 above the middle pole of the three-pole circuit interrupter 1. Thus, the operator may grasp the handle 29 to effect opening and closing rotative movement of the U-shaped operating lever 28, the latter having a pair of spaced, downwardly extending legs 31, the lower ends of which rotate in recesses 32 provided by the frame members 26.

From the foregoing description, it will be apparent to those skilled in the art that clockwise movement of the operating handle 29 will cause corresponding clockwise rotative movement of the operating lever 28 to cause the overcenter springs 27 to exert their force to the right of the upper pivotal mounting 23 of the toggle mechanism 17. This will effect straightening of the toggle links 18 and 19 to a slightly overcenter position, and will effect contacting engagement between the movable contact 11 and the relatively stationary contact 5. On the other hand, counterclockwise movement of the handle 29 will bring the line of action of the overcenter springs 27 to the left of the pivotal mounting 23, as viewed in FIG. 1, and will effect the collapse of the toggle mechanism 17 to the position indicated in FIG. 1, thereby effecting the separation between the relatively stationary and movable contacts 5, 11.

The circuit interrupter 1 also includes a tripping device, generally designated by the reference numeral 33, and described and claimed in United States patent application, filed November 30, 1956, Serial No. 625,297, by Eugene J. Walker and Howard E. Reichert, and assigned to the assignee of the instant application. Reference may be had to the aforesaid application for a detailed description and operation of the tripping device 33. This particular tripping device 33 is not an essential part of the present invention and will, therefore, only briefly be described. Generally, the tripping device 33 includes an insulating trip bar 35, which extends across the three poles of the interrupter 1 and may be rotated by any one of three tripping screws 36, each of which is disposed at the outer end of a bimetallic strip 37, associated with each pole of the interrupter 1. A flexible conductor 38 electrically interconnects the outer end of each bimetallic element 37 with an L-shaped conducting bracket 39 having its outer end 40 connected to a second pressure-type, line-terminal connector 41.

To the lower end of the bimetallic strip 37 for each pole of the interrupter 1 is secured a conducting bracket 43, which is electrically connected, by means of a flexible conductor 44, to the movable contact arm 12.

Thus, in the closed-circuit position of the interrupter 1, the electrical circuit therethrough includes line-terminal connector 41, connecting bracket 39, flexible connector 38 through bimetallic strip 37 to conducting bracket 43. The circuit then extends through the flexible connector 44, and through the contact arm 12 to the movable contact 11. The circuit then includes the relatively stationary contact 5 and conducting strip 6 to the other line terminal connector 9 of the particular pole being considered, in this case the central pole of the interrupter 1.

As well known by those skilled in the art, upon the separation of the relatively stationary and movable contacts 5, 11, an arc will be established, and the provision of an arc-extinguisher 46, to rapidly effect the extinction of this arc, is necessary. An important feature of the present invention is the highly improved arc-extinguisher 46, which includes spaced metallic plates and a molded arc-chute structure, as more fully described hereinafter.

As mentioned, to effect the rapid extinction of the arc drawn between the separable contacts 5 and 11 an arc-chute structure, generally designated by the reference numeral 46 is provided. Generally, the arc-chute structure 46 includes a pair of cooperating, mating, arc-chute, side-plate sections 47, 48, which support fixedly into position a multiplicity of spaced slotted metallic plates. Preferbaly, the metallic plates are formed from a suitable magnetic material, such as steel. The collective action of the several magnetic plates is such as to magnetically draw the established arc 49 within the slotted plate structure. Here, the single initially established arc 49 is broken up into a plurality of serially related arc portions, as indicated by the reference numeral 50 in FIG. 1. Although FIG. 1 illustrates the fully open-circuit position of the interrupter 1, for purposes of description, the initially established arc 49, and the subsequently formed, serially related arc portions 50 are indicated in the figure.

Figure 2:
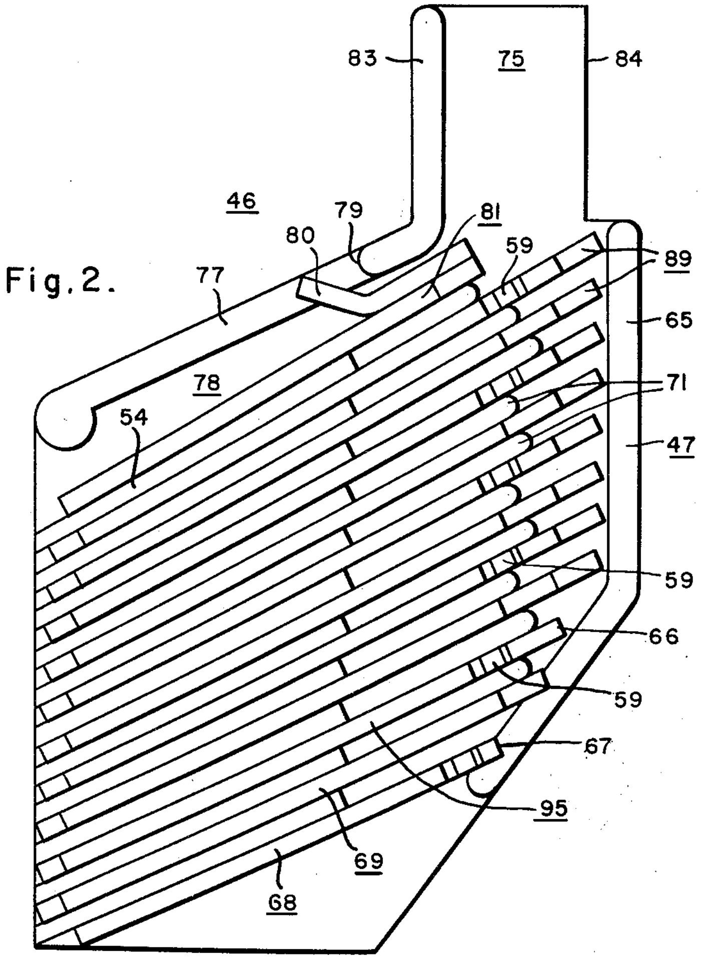
FIG. 2 is an enlarged vertical sectional view taken through one of the three arc chutes of the circuit interrupter of FIG. 1.
Figures 11, 12:
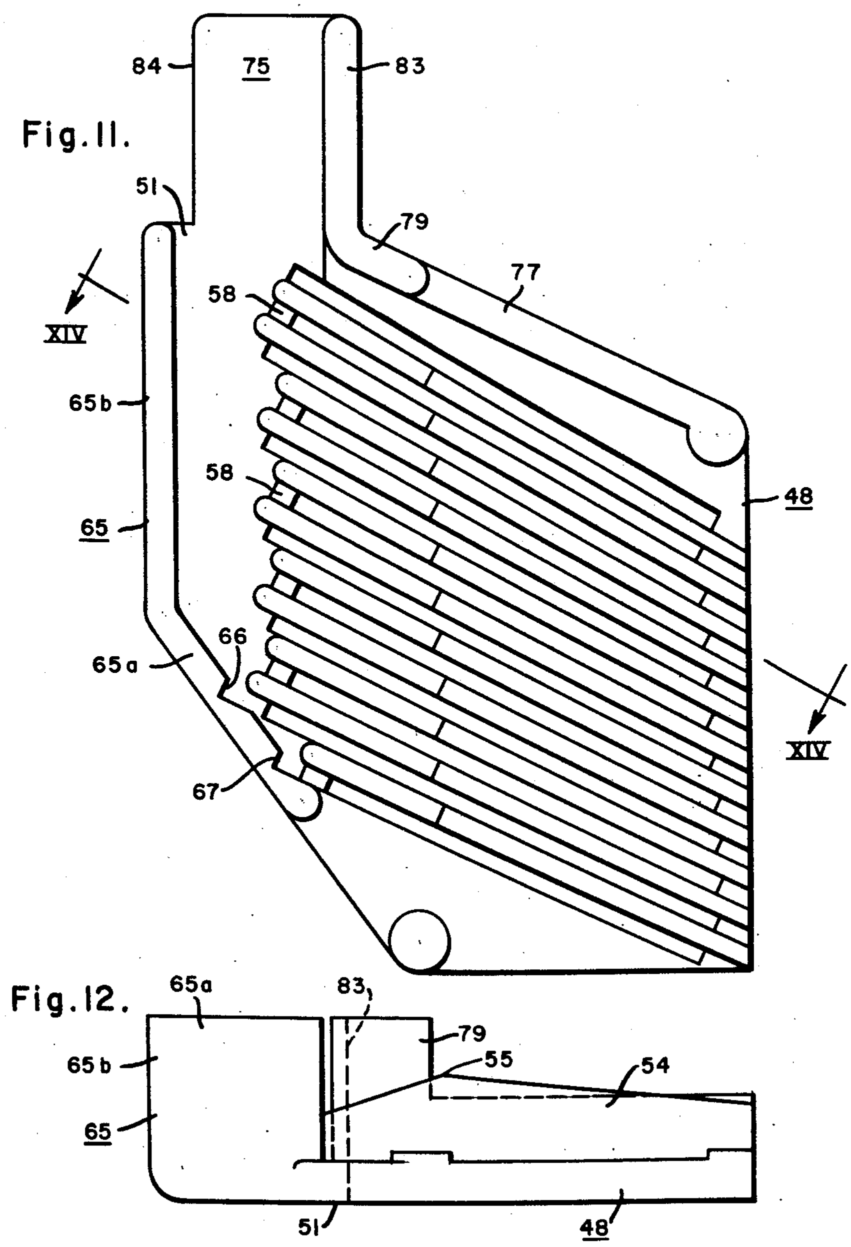
FIG. 11 is a side elevational view of the cooperating, mating, right-hand, side-plate section, which, together with the left-hand section completes the improved arc-chute enclosure.
FIG. 12 is a bottom plan view of the right-hand side-plate section of FIG. 11.

With reference to FIGS. 2 and 11, which respectively illustrate the left-hand side-plate section 47 and the right-hand side-plate section 48, it will be noticed that both side-plate sections 47, 48 are molded from a suitable molding material. Unusual interrupting effectiveness is obtained, with an unusually small-size arc chute, by employing the molding material hereinafter described. However, certain features of the present novel arc-chute construction 46 are applicable to arc chutes constructed from other molding materials. Also certain features of the invention are not dependent upon a molded arc-chute construction, but may conveniently be used with other types of arc chutes, for instance arc chutes comprising a plurality of cemented, or bolted-together parts.

Figures 4, 5, 6:
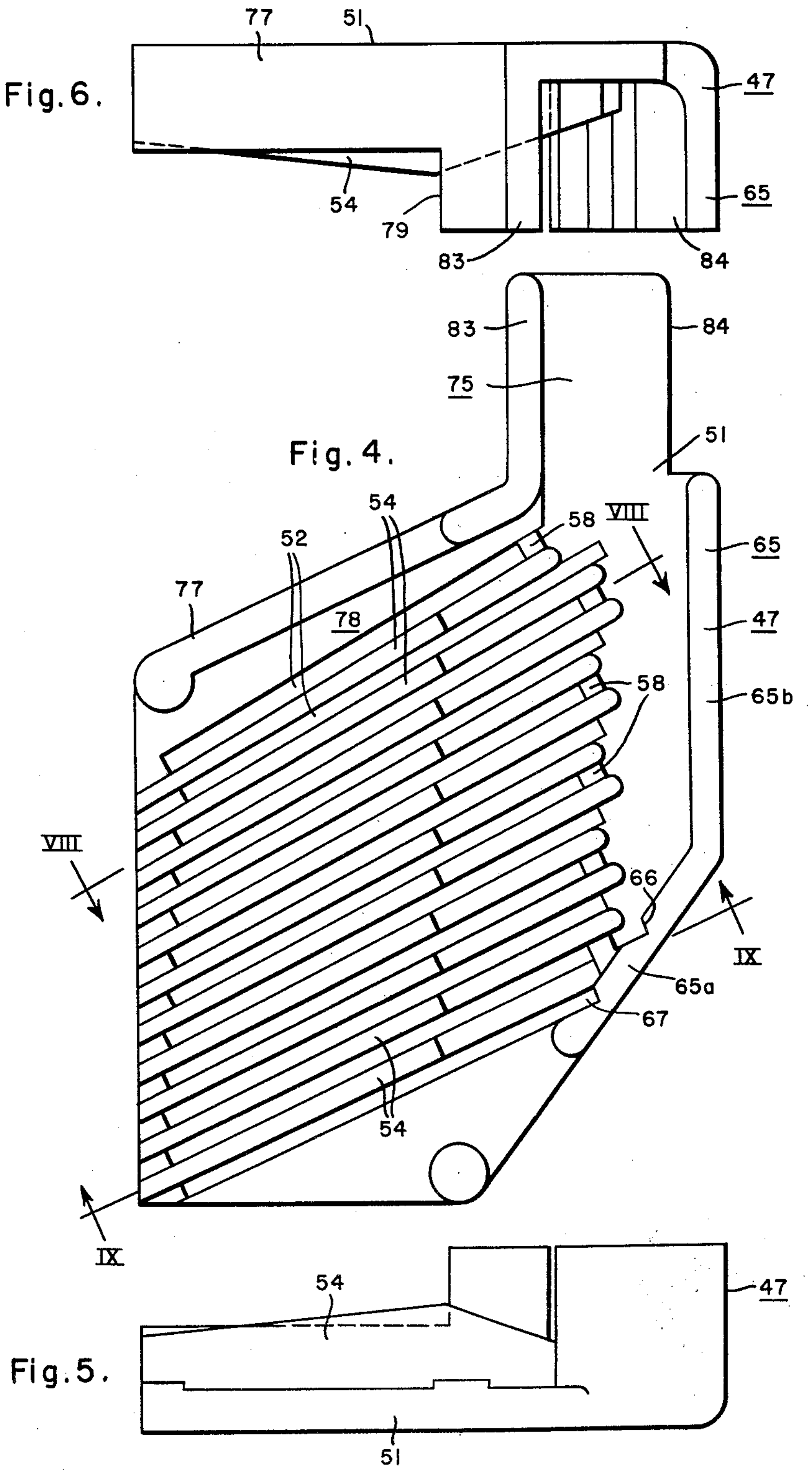
FIG. 4 is a side elevational view of one of the two molded arc-chute side-plate sections, in this case the left-hand section.
FIG. 5 is a bottom plan view of the side-plate section of FIG. 4.
FIG. 6 is a top plan view of the side-plate section of FIG. 4.

With reference to FIGS. 4–6, it will be observed that the left-hand arc-chute side-plate section 47 includes an upstanding side-plate portion 51 having a multipicity of spaced, slightly diverging mounting grooves 52 therein. As brought out hereinafter, the side edges of the slotted magnetic plates are positioned, upon assembly, within these spaced, slightly diverged mounting grooves 52.

Figure 8:
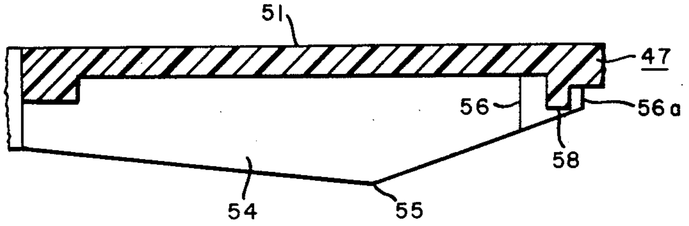
FIG. 8 is a fragmentary view taken substantially along the lines VIII—VIII of FIG. 4.
Figure 7:
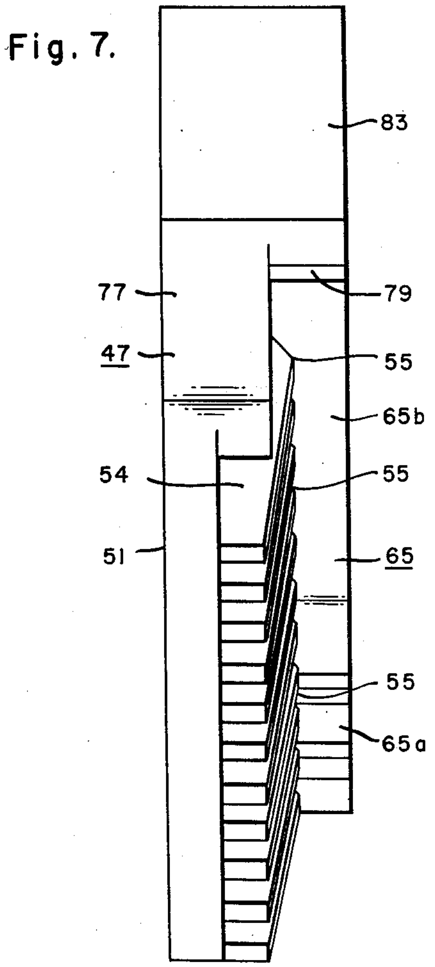
FIG. 7 is a front end elevational view of the side-plate section of FIG. 4.
Figure 10:
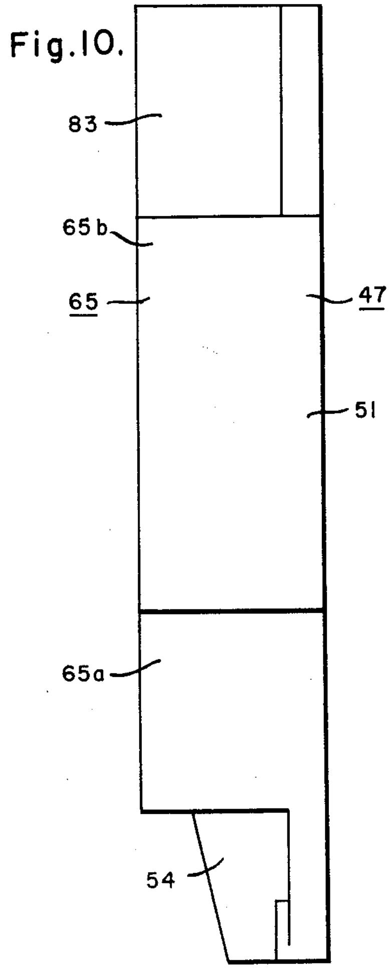
FIG. 10 is a rear end elevational view of the side-plate section of FIG. 4.
Figure 9:
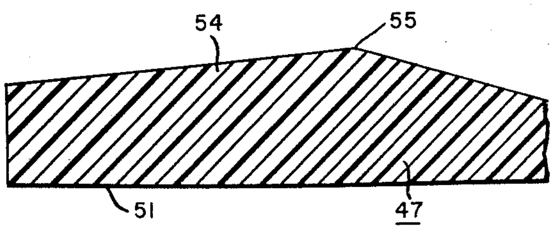
FIG. 9 is a fragmentary view taken substantially along the line IX—IX of FIG. 4.
Figure 13:
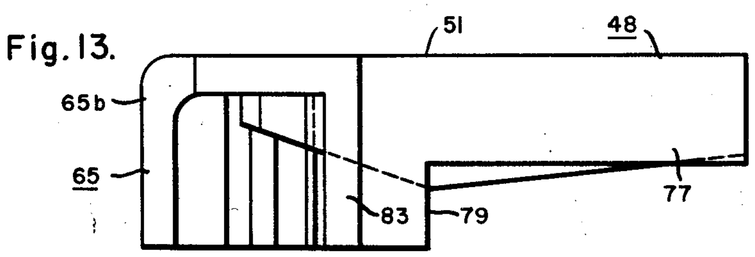
FIG. 13 is a top plan view of the right-hand side-plate section of FIG. 11.

Disposed between contiguous mounting grooves 52 are integrally molded spacing ribs 54. As indicated in FIG. 7, the spacing ribs 54 have appreciable width, and taper inwardly to the point 55, at which the spacing ribs taper outwardly toward the side plate portion 51, terminating at a slight shoulder 56 or **56*a* (FIG. 8). Thus, the spacing ribs 54 have a slightly increasing width to the point 55, at which there is a diminution of width toward the rear end of the arc chute 46**.

As shown in FIG. 8, integrally molded lugs 58 are provided at the rear ends of alternate mounting grooves 52. These lugs 58 register with notches 59 provided on the sides of the magnetic plates to interlock the magnetic plates into proper position, thereby preventing their longitudinal displacement. The side-edge portions 60 of the magnetic plates, that is, the plate material between a shoulder 61 and a shoulder 62, or between the shoulder 61 and the notch 59 cooperate with the mounting grooves 52 to assist in this limiting action.

In addition, each arc-chute, side-plate section 47, 48 also has an integrally molded rear, laterally extending closing flange portion 65. As shown in FIG. 4, the closing flange portion 65 has a slanting rearward part **65*a* and an upward extending part 65*b*. The slanting rearward part 65*a* has a pair of notches 66, 67 formed therein to assist in holding the bottom plate 68 and the next plate 69 in position. As indicated in FIG. 3, the two closing flange portions 65 meet to close the rear side of the arc chute 46**.

With reference to FIG. 2, it will be observed that the spacing ribs 54 define a multiplicity of venting passages 71 extending toward the rear end of the arc chute. At the point 55 of the spacing ribs 54, the venting passages 71 diverge outwardly, thereby increasing the cross-sectional venting area. The rear corners 72 of the metallic plates are cut off, thus defining a pair of vertical flow venting passages, which extend upwardly and communicate with an upper chimney portion 75, hereinafter described.

The upper spacing rib 54 is positioned a greater distance from an integrally molded upper flange portion 77 than the distance between adjoining spacing ribs 54, thereby defining an upper enlarged venting passage 78 (FIG. 4), which communicates directly with the aforesaid chimney portion 75. In addition, the upper venting passage 71, defined by the upper spacing ribs 54 of the two side-plate sections 47, 48, also communicates directly with the chimney portion 75.

Figure 3:
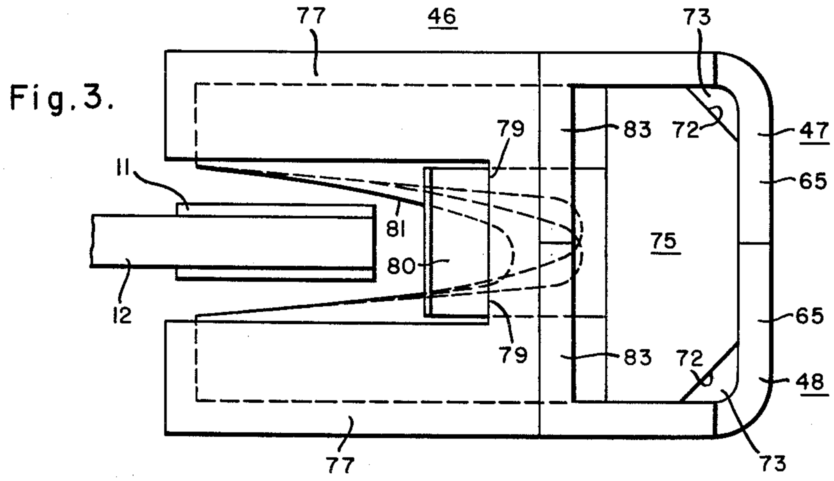
FIG. 3 is a top plan view of the arc chute of FIG. 2 and also illustrating the separable contacts.

As shown in FIGS. 2 and 3, the upper flange portion 77 abruptly extends laterally as at 79 (FIG. 6) rearwardly of an upper arc-horn 80, spot-welded to the top magnetic plate 81, and meets with a similar flange portion 77 of the cooperating side-plate section. Also, a pair of front-facing, upwardly extending, closing flange portions 83 of the side-plate sections 47, 48 meet, and define the aforesaid chimney portion 75, which is vented rearwardly, as at 84, above the flange parts **65*b*, through a screened opening 85 provided in the molded cover 3**.

Figure 19:
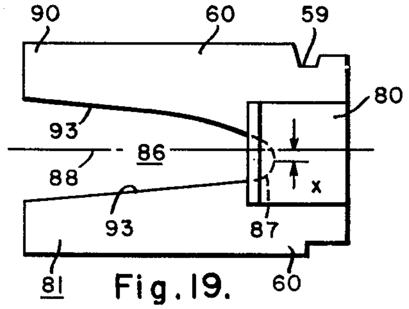
Figure 17:
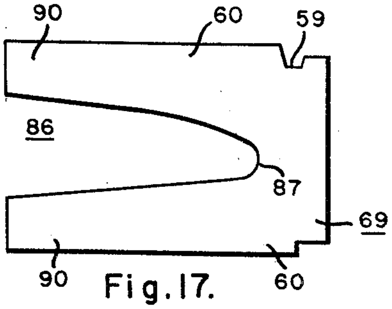
Figure 20:
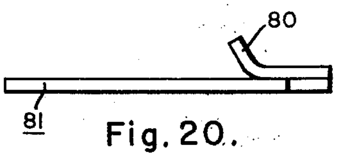
Figure 21:
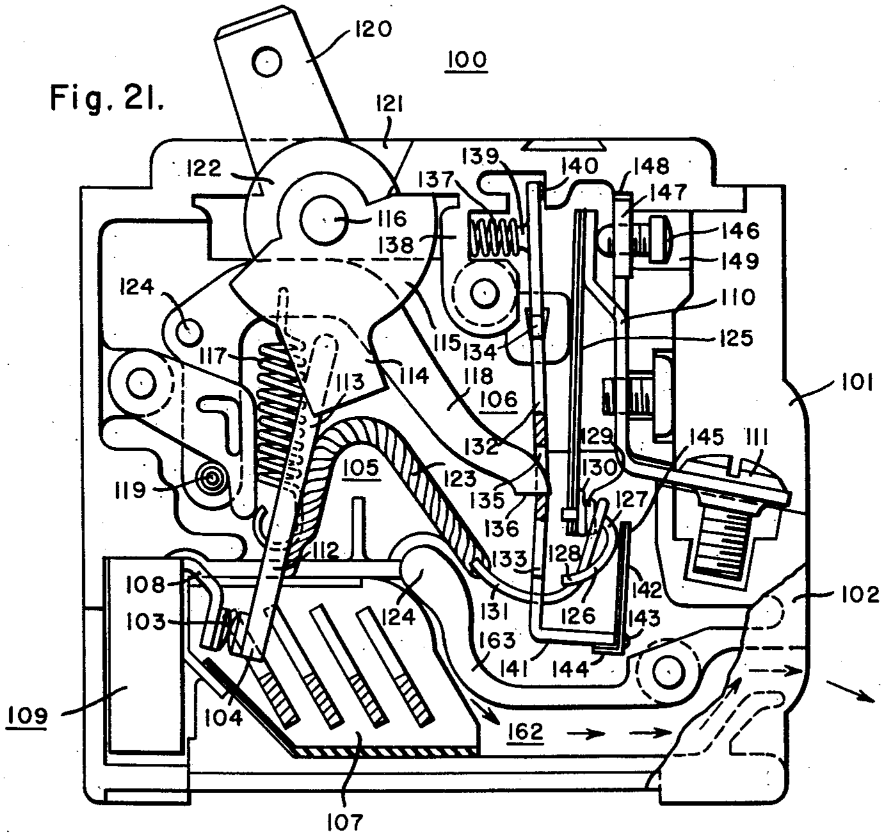
FIG. 21 illustrates a generally vertical sectional view taken through a modified type of circuit interrupter, adapted for a lower interrupting rating than the circuit interrupter of FIG. 1, and utilizing the principles of the present invention, with the contact structure being illustrated in the closed-circuit position.

The magnetic plate construction for the arc chute 46 will now be described. With reference to FIGS. 19 and 20, the top, slotted, arc-horn plate 81 has the arc-horn tab 80, of rectangular configuration, spot-welded, or otherwise secured thereto. This top arc-horn 80 serves as a terminal of an arc portion **50*a*, more clearly indicated in FIG. 1, although FIG. 1 illustrates the fully open-circuit position of the interrupter 1. With reference to FIG. 19, it will be observed that the top arc-horn magnetic plate 81 has an elongated slot 86 provided therein, the apex 87 of which is off center from the center line 88 of the plate 81. For ease of production, the top magnetic plate 81 may be formed from the long magnetic plates 89, hereinafter described by cutting off portions of the legs 90 at the front and rear ends, as indicated by the dotted lines 91, 92 of FIG. 15. As shown in FIG. 19, the sides 93 of the tapered slot 86 gradually converge inwardly to form an apex 87, which, as mentioned, is positioned off-center a slight amount, as indicated by the distance X in FIG. 19. The arc-horn plate 81 has a notch 59 on one side to interlock with the top lug 58 provided on the lefthand, side-plate section 47**.

Figure 14:
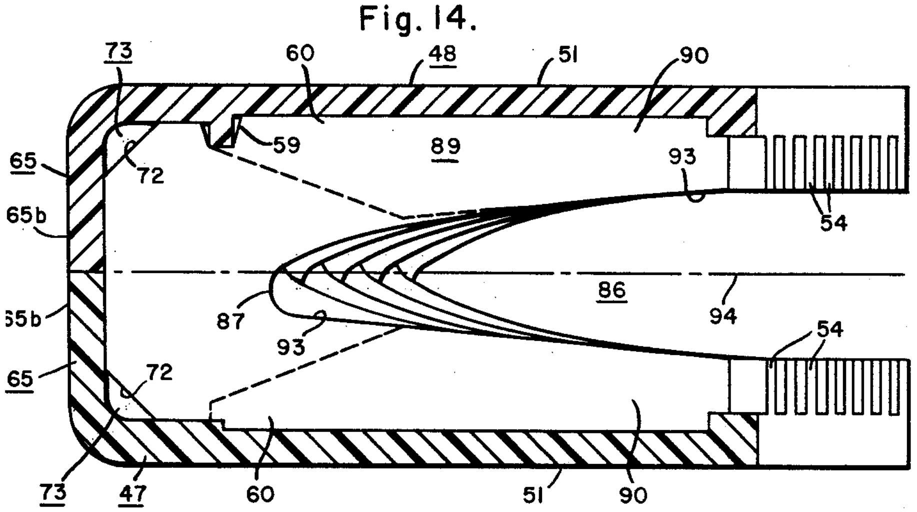
FIG. 14 is a sectional view taken substantially along the line XIV—XIV of FIG. 11, illustrating an assembled arc chute with the staggered magnetic plates in position.
Figure 15:
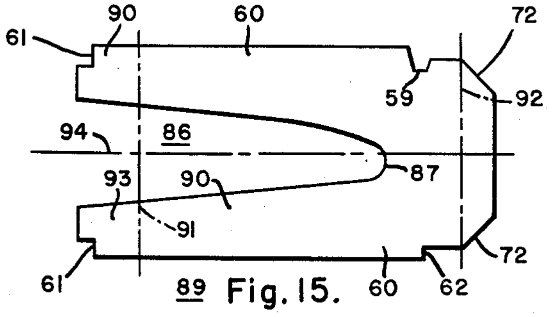
FIGS. 15–20 illustrate plan views of plate details.
Figure 18:
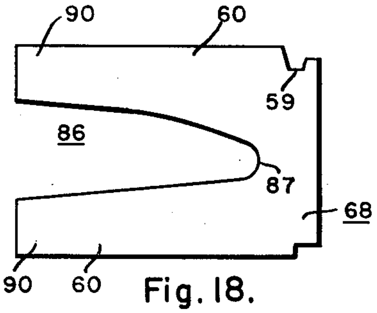
Figure 16:
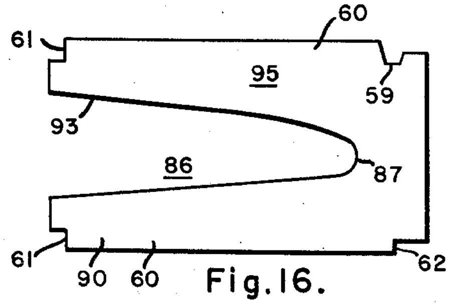

Immediately below the top arc-horn plate 81 is a multiplicity of relatively long, slotted, magnetic plates 89, all of the configuration illustrated in FIG. 15. By reversing the plates alternately, during assembly of the arc chute, the notches 59 occur first to one side of the center line 94 of the arc chute 46, and then to the other side of the center line 94 of the arc chute 46. This corresponds with the alternate positioning of the lugs 58 provided by each side-plate section 47, 48. Also, the alternate reversing of the long magnetic plates 89 provides a staggering of the several apices 87 on opposite sides of the center line 94 of the arc chute 46 as shown in FIG. 14. This has the important advantage of stretching the arc in a zigzag fashion, rather than letting it extend in a straight line. The zigzag stretching effect gives a longer arc path, and this stretching effect provides excellent arc interruption in a short space.

Immediately below the eight relatively long, steel, slotted plates 89 are three shorter plates 95, 69 and 68, which have progressively shorter lengths, to accommodate the rearwardly slanting closing flange parts **65*a*. As before, for simplicity of production, these three shorter plates 68, 69 and 95 may be formed from the relatively long plates 89 of FIG. 15 by cutting off portions of the longer plates 89**.

By way of recapitulation, during the opening operation, the single, initially established arc 49 is lengthened by continued opening motion of the contact arm 12. The arc is attracted into the magnetic plate structure by the distortion of the magnetic field surrounding the arc 49. The arc moves to the position where a terminal thereof attaches to the upper arc horn 80. The arc portion **49*a* moves to the closed apices 87 of the several magnetic plates, whereby, by virtue of the staggering of the apices 87, the arc 49*a* is lengthened rapidly in a zigzag manner. The arc may then enter between the several magnetic plates as a plurality of serially related arc portions 50**.

The arc portions 50 move rearwardly into the arc chute 46, where cooling and intense deionization occurs as a result of gas evolution from the molded arc-chute halves 47, 48. The arc gases move toward the rear of the arc chute 46 due to the widened exhaust passages 71, 78 and due to the chimney effect, which vents the gases freely through the screened opening 85 in the molded cover 3. Arc extinction occurs rapidly and the circuit is interrupted. The enlarged upper venting passage 78 allows the arc gases to freely escape through the chimney 75 and not back into the mechanism compartment 96 of the breaker 1.

The molding material, from which the arc-chute sections 47, 48 are molded is a non-ceramic molding composition from which strong and durable arc-chute halves 47, 48 can be molded without the employment of high temperature.

The molded side-plate sections 47, 48 are characterized by the presence of a substantial proportion of an oxide or hydrate of aluminum in its composition. The composition of the molding material includes a suitable organic binder and a filler, the aluminum oxide or hydrate constituting an ingredient of the filler. The binder comprises from 5% to 75% by weight of the total composition. The filler comprises from 95% to 25% by weight of the total composition. The filler comprises glass fibers, asbestos, or the like in combination with the aluminum oxide or hydrate. The oxide or hydrate comprises from 5% to 90% of the total composition, and the glass or asbestos from 20% to 5% of the total composition.

Four illustrative examples are the following:

*Example 1*

| | Percent |
|---|---|
| Aluminum trihydrate | 70 |
| Polyester resin | 20 |
| Glass fiber | 10 |

*Example 2*

| | Percent |
|---|---|
| Aluminum trihydrate | 65 |
| Polyester resin | 20 |
| Glass fiber | 15 |

*Example 3*

| | Percent |
|---|---|
| Aluminum trihydrate | 60 |
| Polyester resin | 20 |
| Glass fiber | 20 |

*Example 4*

| | Percent |
|---|---|
| Aluminum trihydrate | 73.9 |
| Polyester resin | 18.1 |
| Glass fiber | 8 |

In addition to or in place of a polyester resin, other resins, for example, phenolic, urea, melamine, and silicone resins may be employed as the binder portion of the molding composition.

The active arc-suppressing ingredients, namely, the aluminoxide or hydrate, in the above examples may be used in commercial grades. The aluminum hydrates have the composition indicated by the formula $Al_2O_3.3H_2O$ or $Al(OH)_3$. Aluminum oxide suitable for use in our compositions may be a commercial calcined or tabular alumina, usually an aluminum hydrate calcined or heated to 1800°–3500° F., but preferably has not been fused. Fused alumina, which requires about 3700° F. for its formation, exists as crystals which are abrasive in character and result in excessive wear of molds.

In cold-molding arc-suppressing devices employing organic binders, the ingredients are preferably first blended in a dry state. The blended dry mixture is then wetted with an agent capable of liquefying or softening the binder, and mixing is continued. The wet mixture is then granulated and molded under pressure into the desired shape. Following the molding operation, the devices are cured in baking ovens under elevated temperature which gradually increases to a maximum of 300 to 400° F.

Compositions embodying organic binders may alternatively be made by a hot-molding process. In that event, a wet mixture produced as above set forth would be dried before granulating, and the dry granular product molded into an article of the desired form under heat and pressure, as in conventional compression-molding methods. Since fluidity of a hot-molded mixture depends on softening of the binder, the binder content of such mixtures should preferably not be less than about 35%.

The aforesaid molding material has excellent dielectric strength, and permits the magnetic plates to be spaced closely together. The molding material prevents the plates from shorting to each other because the molding material is actually between the plates in the form of the ribs 54.

As shown more clearly in FIG. 14, the ribs 54 extend inwardly to substantially the inner edges 93 of the legs 90 of the metallic plates and extend therealong toward the rear end of the arc chute 46 for an appreciable distance. This configuration not only prevents shorting between metallic plates, but also assists in gas evolution. The close spacing of the magnetic plates permits getting more metallic mass into the arc chute 46.

During interruption the material has the advantage of releasing water and carbon forming carbon monoxide (CO), carbon dioxide ($CO_2$) and water. The molding material has a regenerative characteristic in that it will absorb water, and replenish the supply of water that is released when the arc strikes it.

A single pole of the circuit interrupter 1 of FIG. 1 has interrupted 10,000 amperes at 600 volts, illustrating the remarkable interrupting performance of the arc-chute structure 46.

Referring to FIGS. 21–24 illustrating a further embodiment of the invention, the circuit breaker 100 comprises generally an enclosing housing, including an open-sided base, or housing member 101 and a cover plate, or cooperating housing part 102 both made of molded insulating material, the cover plate being shown mostly broken away for clearness, a stationary contact 103, a movable contact 104, an operating mechanism 105, a trip device 106 and an arc extinguisher 107.

The stationary contact 103 is rigidly secured to the inner end of a conducting member 108, which is integral with a plug-in line terminal connector 109 supported in the housing 101 and in the cover 102 at one end of the housing. At the opposite end of the housing 101 is disposed a conducting strip 110 which, at its inner end, is connected to the trip device 106, and which at its outer end is provided with a load-terminal connecting means, such as a screw 111, for connecting the breaker into an electrical circuit.

The movable contact 104 is rigidly secured on the free end of a U-shaped switch arm 112 of conducting material having its legs 113 supported in recesses in the legs 114 of a U-shaped operating lever 115 of molded insulating material. The operating lever 115 is pivotally supported by trunnions 116 molded integral with the operating lever, and mounted in companion openings in the housing members 101 and 102. An overcenter spring 117 is connected under tension between the bight of the switch member 112 and a releasable carrier member 118, pivoted on a pin 119 supported in the housing members 101 and 102.

The operating lever 115 is provided with an integral handle portion 120 which extends outwardly through an opening 121 in the top of the housing member 101. The operating lever 115 is also provided with an arcuate portion 122 cooperating with the housing parts 101 and 102 to substantially close the opening 121 in all portions of the operating lever. The switch member 112 is electrically connected by a flexible conductor 123 of stranded wire, to the strip device 106, as will be more fully described later.

The switch arm 112 is operated, to manually open and close the contacts by operation of the lever 115, which is effected by manipulation of the handle 120. Movement of the handle 120 in a clockwise direction carries the pivoted ends of the legs 113 of the switch member 112 across to the left of the line of force of the operating spring 117, which then biases the switch member to the open position and consequently causes movement of the switch member to the open position with a snap action.

The contacts are manually closed by reverse movement of the operating lever 115. Counterclockwise movement of the operating lever 115 from the "off" to the "on" position moves the upper pivoted ends of the legs 113 of the switch member 112 across to the right of the line of force of the spring 117 which then acts to close the contacts with a snap action.

The circuit breaker is tripped open after a time delay in response to overload currents below a predetermined value, and instantaneously in response to overload currents above the predetermined value, or in response to short-circuit currents, by operation of the trip device 106, which will be hereinafter described. Operation of the trip device 106 causes release of the carrier means 118 whereupon the operating spring 117 moves the releasable carrier means 118 clockwise about its pivot 119. This moves the line of force of the spring 117 across to the right of the center line and pivot point of the switch arm 112, and the spring 117 then acts to move the switch arm to the open position with a snap action. The movement of the releasable means 118 is arrested by engagement with a projection or wall 124 molded integrally with the housing parts 101 and 102.

The trip device 106 comprises a bimetallic element 125 having one end supported on the inner end of the conducting strip 110 and its lower end free. A U-shaped magnet yoke 126 has one leg 127 rigidly mounted on the bimetal element 125 adjacent the free end thereof, and the other leg 128 of the yoke 126 of magnetic material extends downwardly and is spaced from the free end of the bimetallic element. A multiple-turn energizing coil 129 is wound about one of the legs, preferably the upper leg 127, of the magnet yoke 126 and has one end 130 suitably secured, as by welding, to the bimetallic element 125 near its lower end. The other end 131 of the coil 129 is welded, or otherwise suitable secured, to the end of the stranded flexible conductor 123. The coil 129 is made of solid wire, which retains its coiled shape, and is enameled, varnished or otherwise insulated, to prevent its turns being short circuited.

A trip member 132, having an armature portion 133 of magnetic material, is pivotally supported by means of lateral projections 134 thereon, which extend into opposed openings in the housing parts 101 and 102. The trip and armature member 132 extends along the left or high-expansion side of the bimetal 125, and has a latch opening 135 therein into which the latch end 136 of the releasable carrier 118 extends, and is thereby releasably restrained in operative position. A relatively light spring 137, compressed between a spring seat 138 in the housing portion 101 and a spring guide 139 on the armature above the pivot 134, biases the trip member 132 to latching position as shown. The spring 137 is closer to the pivot 134 than the armature portion 133 opposite the magnetic member 126, so that a smaller magnetic force can overcome the spring, and trip the breaker. A stop portion 140 at the top of the trip member 132 engages the housing to fix the latching position of the trip member and the maximum latch overlap between the latch end 136 and the edge of the opening 135.

A portion 141 of the lower end of the trip member 132 is formed substantially at right angles to the main body 132 of the trip member, and extends toward the right below the magnet yoke 126. An ambient-temperature compensating bimetallic element 142 is rigidly secured to the right end of the portion 141, and extends upwardly to the right of the magnet yoke 126. The compensating bimetal 142 is secured to the end portion 141 of the trip member 132, preferably by having a projection 143 on the portion 141 extending through a hole in the bimetal, and spun, or riveted over as shown, with the bent-over lower end 144 of the bimetal preventing it from turning on the projection 143. An insulating button 145 on the compensating bimetallic element 142 adjacent the magnet yoke 126 insulates it from the magnet yoke, so that none of the current of the circuit flows through the compensating bimetal element.

Means is provided for calibrating the trip device, and comprises a screw 146 threaded through a nut 147 disposed in a recess 148 in the adjacent end wall of the housing 101. The inner end of the screw 146 engages the upper end of the conducting strip 110, on which the bimetallic element 125 is mounted. An access opening 149 is provided, through which the screw 146 may be rotated to adjust the trip device, after which the opening 149 may be sealed to prevent tampering. Turning the screw 146 causes bending of the conductor 110 and corresponding variation of the position of the bimetallic element 125 according to the direction in which the screw is rotated, to thereby vary the thermal tripping point of the breaker.

Upon the occurrence of a low persistent overload current below a predetermined value of, for example, tentimes normal rated current, the bimetallic element 125 is heated, and bends toward the right, carrying the magnet yoke 126 therewith. The magnet yoke 126 through the insulating button 145, and the ambient-temperature compensating bimetallic element 142 rotates the trip member 132, including the armature portion 133, counterclockwise, causing it to release the carrier 118. The releasable means, or carrier 118 then causes movement of the switch arm 112 to the open contact position in the previously described manner.

When an overload current above a value such, for example, as ten-times the normal rated current, or a shortcircuit current occurs, the electromagnetic trip means is energized, and the armature portion 133 of the trip member 132 is attracted toward the magnet yoke 126, causing instantaneous release of the carrier means 118 and opening of the contacts. This action takes place independently of the bimetal 125, which does not have to be bent, and may be relatively stiff.

Certain features of the described structure are set forth and claimed in United States patent application filed April 12, 1957, Serial No. 652,538, by Francis L. Gelzheiser and Lloyd W. Dyer, and assigned to the assignee of the instant invention.

Figures 22, 23, 24:
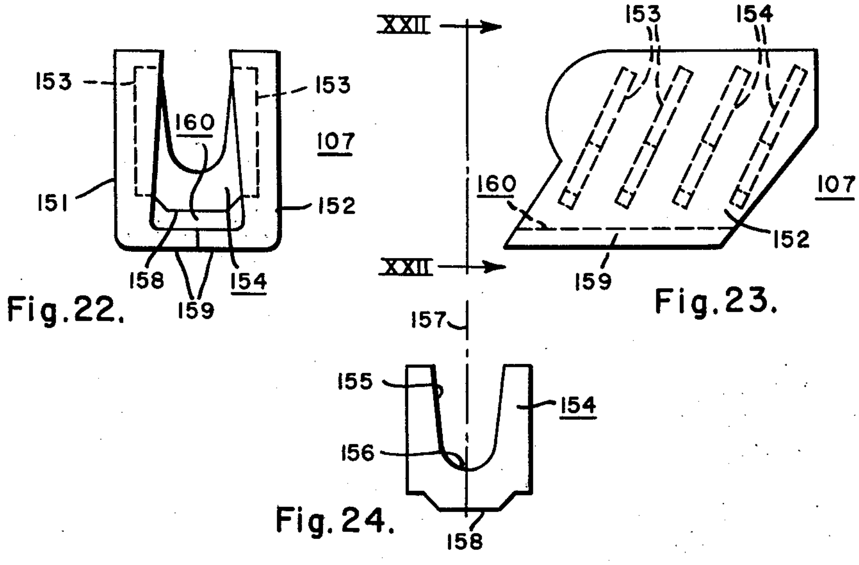
FIG. 22 illustrates an end elevational view of the arc-chute structure employed in the modified circuit interrupter of FIG. 21, the end elevational view being taken along the line XXII—XXII of FIG. 23, looking in the direction of the arrows.
FIG. 23 shows, in side elevation, the arc chute utilized in the circuit interrupter of FIG. 21, the view being taken from the opposite side than the view of the FIG. 21; and, FIG. 24 illustrates, in plan, one of the magnetic plates used in the arc chute of FIG. 23.

To facilitate the extinction of the arc drawn between the movable and relatively stationary contacts 103 and 104 the arc extinguisher, or arc chute 107 is provided. With reference to FIGS. 22 and 23 of the drawings, it will be noted that the arc chute 107 comprises two cooperating side-plate sections 151, 152, each of which is preferably molded from the molding material described above. Mounting slots, or grooves 153 are molded on the inner sides of the side-plate sections 151, 152 to support, in fixed position, a plurality of spaced, slotted magnetic plates 154. The magnetic plates 154 may be stamped from sheet steel strip. As shown more clearly in FIG. 24, each slotted magnetic plate has a converging slot 155 provided therein, which terminates as an apex 156. As shown, the apex 156 is positioned symmetrically with respect to the center line 157 of the plate 154.

With reference to FIG. 22, it will be observed that the rear ends 158 of the magnetic plates 154 are spaced away from the mating flange portions 159 of the side-plate sections 151, 152 to provide a venting passage 160 therebetween.

The operation of the arc extinguisher 107 will now be described. During the opening operation of the circuit breaker 100, the arc, not shown, established between the relatively stationary and movable contacts 103, 104 is attracted magnetically into the slots 155 of the steel plates 154, and toward the apices 156 thereof. As in the first embodiment of our invention, the established arc is split up into a plurality of serially related arc portions between the spaced plates 154, cooled and rapidly extinguished. The arc gases are vented to the rear of the arc chute 107 and along the venting passage 160. From here, the exhaust arc gases are vented from the circuit breaker 100 through a venting channel 162, defined by mating flange portions 163, provided on the inner sides of the housing 101 and the cover plate 102. The arrows 164 indicate the exhaust flow of the arc gases out of the circuit breaker 100. A single pole of the device, illustrated in FIG. 21, has interrupted 5,000 amperes at 240 volts illustrating the remarkable interrupting performance.

With this embodiment of the invention, as with the first embodiment of the invention illustrated in FIGS. 1–20, highly effective arc-extinguishing action is achieved by the particular disposition of the plate structure coupled with the use of the aforesaid molding material. As a result, the improved arc chute enables a higher rating to be assigned to the circuit breaker, or for the same rating, the arc extinguisher may be made more compact, permitting thereby a smaller over-all size of the circuit breaker.

A variation of the invention, not shown in FIGS. 21–24, is the simultaneous molding of side-plate sections 151, 152 integrally with the open-sided base 101 and the cover plate 102 respectively. This would expedite the manufacturing processes, minimize the number of parts, render more accurate the positioning of the arc-chute 107 and facilitate assembly. As a result, the enclosure parts would be formed of the strong and durable, high-dielectric-strength molding material, as described above.

Although there have been illustrated and described particular embodiments of the invention, as applied to circuit breakers of different ratings, it is to be clearly understood that the same were merely for the purpose of illustration, and that changes and modifications may readily be made therein by those skilled in the art, without departing from the spirit and scope of the invention.

We claim as our invention:

A circuit interrupter including separable contacts for establishing an arc, an arc chute including a pair of molded mating side-plate sections having grooved inner surfaces forming mounting slots, the material of said molder arc-chute side-plate sections being a composition comprising a water-insoluble binder and an arc-suppressing substance selected from the group consisting of the oxides and hydrates of aluminum, said binder constituting at least 5% by weight of the total composition, a plurality of slotted magnetic plates having leg portions positioned within said mounting slots, each side-plate section having an integrally molded, laterally extending, rear closing flange portion, the two rear closing flange portions meeting, following assembly, to close at least a rear portion of the arc chute, each side-plate section also having an integrally molded upper front laterally-extending closing flange portion, the two upper front closing flange portions also meeting upon assembly to close a front upper portion of the arc chute, each of said molded side-plate sections providing a plurality of substantially parallel spaced ribs extending inwardly and flush for an appreciable distance with the inner sides of the leg portions of the plates to form an aligned laminated entrance portion to the arc chute, a relatively tight rib-and-leg construction resulting, said ribs diverging outwardly at a point before the apices of the magnetic plates is reached, whereby the entering arc is prevented from being diverted laterally onto the leg portions of the slotted magnetic plates and consequently its velocity toward the back end of the arc chute is accelerated.

References Cited in the file of this patent

UNITED STATES PATENTS

| | | |
|---|---|---|
| 1,697,143 | Rose | Jan. 1, 1929 |
| 1,932,090 | Slepian | Oct. 24, 1933 |
| 2,030,582 | Graves | Feb. 11, 1936 |
| 2,048,114 | Gano et al. | July 21, 1936 |
| 2,160,681 | Sandin | May 30, 1939 |
| 2,244,061 | Graves | June 3, 1941 |
| 2,353,729 | Jensen | July 18, 1944 |
| 2,575,730 | Sandin et al. | Nov. 20, 1951 |
| 2,632,074 | Herman | Mar. 17, 1953 |
| 2,648,742 | Edmunds | Aug. 11, 1953 |
| 2,691,711 | Ellis | Oct. 12, 1954 |
| 2,768,264 | Jones et al. | Oct. 23, 1956 |
| 2,772,334 | Latouar | Nov. 27, 1956 |
| 2,806,109 | Sterling | Sept. 10, 1957 |
| 2,942,083 | Walker et al. | June 21, 1960 |

FOREIGN PATENTS

| | | |
|---|---|---|
| 589,270 | Great Britain | June 16, 1947 |